United States Patent
Shibata

(10) Patent No.: US 8,564,690 B2
(45) Date of Patent: Oct. 22, 2013

(54) PHOTOGRAPHING APPARATUS OF WHICH IMAGE PICKUP AREA IS DIVIDED, AND IMAGE PICKUP DEVICE THEREOF

(75) Inventor: Takashi Shibata, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 977 days.

(21) Appl. No.: 12/038,085

(22) Filed: Feb. 27, 2008

(65) Prior Publication Data

US 2009/0066813 A1     Mar. 12, 2009

(30) Foreign Application Priority Data

Sep. 11, 2007   (KR) .................................. 2007-92310

(51) Int. Cl.
*H04N 5/235* (2006.01)
*H04N 3/14* (2006.01)

(52) U.S. Cl.
USPC ........ 348/230.1; 348/296; 348/311; 348/317; 348/323

(58) Field of Classification Search
USPC ........... 348/220.1, 230.1, 311, 317, 302, 308, 348/323, 322
See application file for complete search history.

(56) References Cited

U.S. PATENT DOCUMENTS

| | | | |
|---|---|---|---|
| 6,252,627 B1 * | 6/2001 | Frame et al. ................... | 348/311 |
| 2004/0245433 A1 * | 12/2004 | Koyama ..................... | 250/208.1 |
| 2005/0001914 A1 * | 1/2005 | Kueny .......................... | 348/294 |
| 2005/0088555 A1 * | 4/2005 | Kanai ........................... | 348/308 |
| 2006/0132862 A1 * | 6/2006 | Morishita ..................... | 358/474 |
| 2008/0106608 A1 * | 5/2008 | Clark et al. ............... | 348/208.99 |

* cited by examiner

*Primary Examiner* — Roberto Velez
*Assistant Examiner* — Joel Fosselman
(74) *Attorney, Agent, or Firm* — Stanzione & Kim, LLP

(57) ABSTRACT

A photographing apparatus and an image pickup device thereof include an image pickup device of which an image pickup area includes a plurality of pixels and is divided into a plurality of sub-image pickup areas, and at least one pixel included in each of the sub-image pickup areas outputs image signals at a same time.

22 Claims, 13 Drawing Sheets

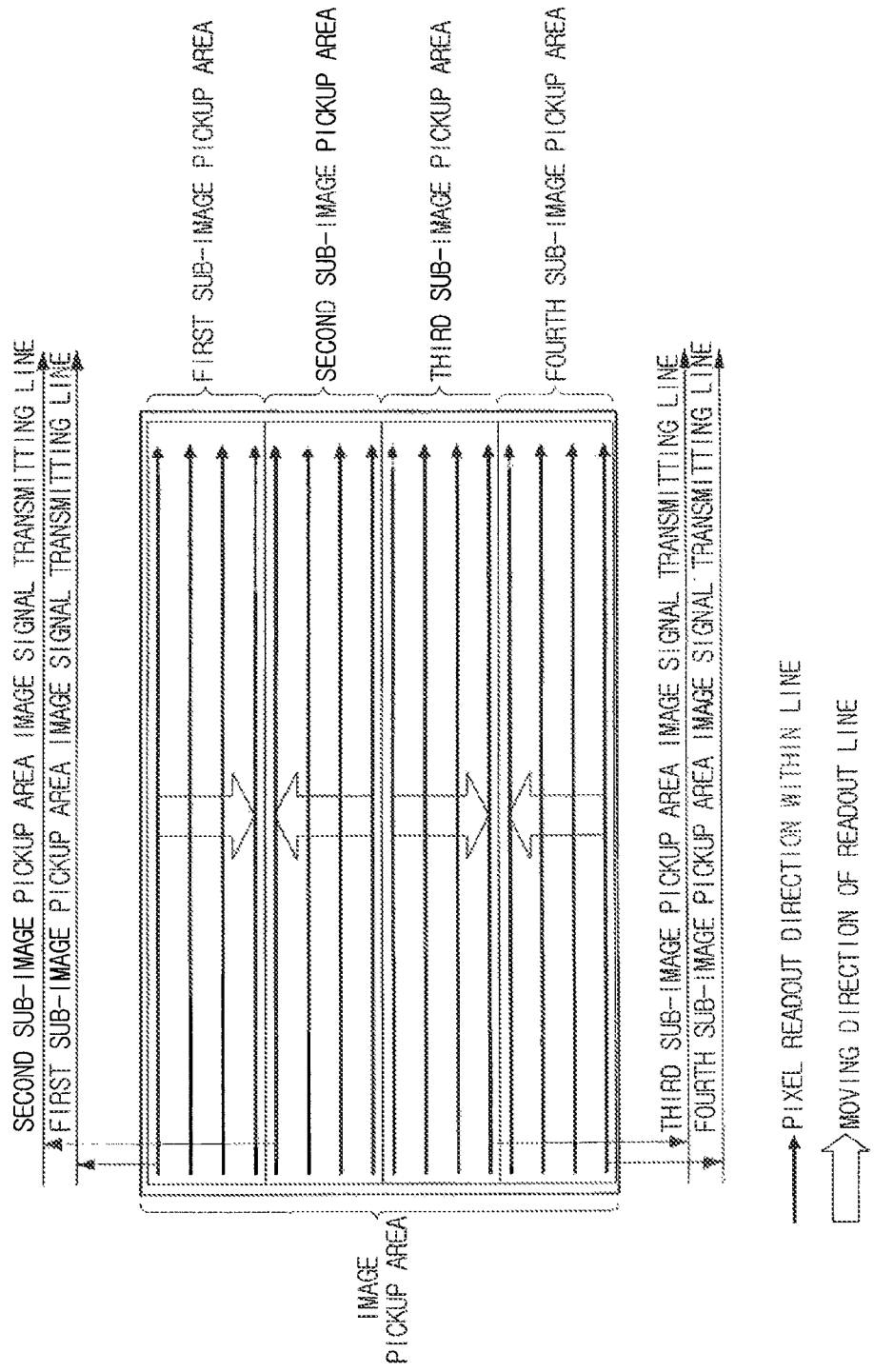

PHOTOGRAPHING APPARATUS OF WHICH IMAGE PICKUP AREA IS DIVIDED, AND IMAGE PICKUP DEVICE THEREOF

CROSS-REFERENCE TO RELATED APPLICATIONS

This application claims priority under 35 U.S.C. §119(a) from Korean Patent Application No. 10-2007-0092310, filed on Sep. 11, 2007, in the Korean Intellectual Property Office, the disclosure of which is incorporated herein by reference in its entirety.

BACKGROUND OF THE INVENTION

1. Field of the Invention

The present general inventive concept relates to a photographing apparatus and an image pickup device thereof, and more particularly, to a complementary metal oxide semiconductor (CMOS) type photographing apparatus which employs a rolling shutter method and an image pickup device thereof.

2. Description of the Related Art

An image pickup device is an element to generate an image in a mobile phone camera or a digital still camera (DSC). Image pickup devices include charge coupled devices (CCD) and a-complementary metal oxide semiconductor (CMOS) devices. The CCD is characterized by high quality, high cost, and high power consumption, and the CMOS is characterized by low quality, low cost, low-power consumption, and multifunction.

However, with the development of semiconductor process and circuit technologies, a noise characteristic, which is a main disadvantage of the CMOS, has been improved, and recently, the CMOS is utilized in the machine vision field that requires high definition and high performance.

As a method for reading out an optical image from an object captured on an image pickup area of the image pickup device, a global shutter method and a rolling shutter method are suggested. In the global shutter method, all of pixels of the image pickup area read out an optical image at a same time. In the rolling shutter method, one or several pixels in the image pickup area read out an optical image in sequence.

The CMOS type image pickup device can employ both the global shutter method and the rolling shutter method. Since all of the pixels read out an optical image from an object at the same time in the global shutter method, a photographed image is not deformed even if the object moves.

Alternatively, in the CMOS type image pickup device employing the rolling shutter method, since one or several pixels read out an optical image in sequence, a photographed image is likely to be deformed if the object moves. Accordingly, if a moving object is photographed, a photographing apparatus employing the rolling shutter method has difficulty reproducing a normal image, which causes an inconvenience to users.

The users wish to obtain a high definition image when photographing an object. Accordingly, there has been a demand for lessening a degree of deformation of a photographed image for a moving object.

SUMMARY OF THE INVENTION

The present general inventive concept provides a photographing apparatus having an image pickup area divided into a plurality of sub-image pickup areas as a solution of lessening a degree of deformation of a photographed image for a moving object, and an image pickup device thereof.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a photographing apparatus including an image pickup device of which an image pickup area includes a plurality of pixels and is divided into a plurality of sub-image pickup areas, at least one pixel included in each of the sub-image pickup areas to output image signals at a same time, and an image processor to process the image signals output from the image pickup device.

The photographing may further include a BUS to transmit the image signals output from the image pickup device to the image processor through a number of channels corresponding to a number of sub-image pickup areas.

The photographing apparatus may further include a storage unit to store the image signals output from the image pickup device, and the image pickup device may transmit an image signal output from the at least one sub-image pickup area of the image pickup device to the image processor and transmit an image signal output from a remaining sub-image pickup area to the storage unit.

At least one pixel included in each of the sub-image pickup areas may be symmetrical to at least one pixel included in each of remaining sub-image pickup areas with respect to a boundary between the sub-image pickup areas.

At least one pixel included in each of the sub-image pickup areas may be symmetrical to at least one pixel included in each of remaining sub-image pickup areas with respect to an intersection point at which boundary lines of the sub-image pickup areas cross over.

The image pickup area may be divided into a plurality of sub-image pickup areas which are arranged in a line to one direction, and at least one pixel included in an odd numbered sub-image pickup area may output an image signal from an uppermost line to a bottommost line and from left to right within one line in sequence, and at least one pixel included in an even numbered sub-image pickup area may output an image signal from the bottommost line to the uppermost line and from the left to the right within one line in sequence.

The image pickup area may be divided into a plurality of sub-image pickup areas which are arranged in a line to one direction such that at least one pixel included in an odd numbered sub-image pickup area may output an image signal from an uppermost line to a bottommost line and from right to left within one line in sequence, and at least one pixel included in an even numbered sub-image pickup area may output an image signal from the bottommost line to the uppermost line and from the right to the left within one line in sequence.

The image pickup area may be divided into a plurality of sub-image pickup areas which are arranged in a line to once direction such that at least one pixel included in an odd numbered sub-image pickup area may output an image signal from a bottommost line to an uppermost line and from left to right within one line in sequence, and at least one pixel included in an even numbered sub-image pickup area may output an image signal from the uppermost line to the bottommost line and from the left to the right within one line in sequence.

The image pickup area may be divided into a plurality of sub-image pickup areas which are arranged in a line to one direction such that at least one pixel included in an odd numbered sub-image pickup area may output an image signal from a bottommost line to an uppermost line and from right to left within one line in sequence, and at least one pixel included in an even numbered sub-image pickup area may output an image signal from the uppermost line to the bottommost line and from the right to the left within one line in sequence.

The image pickup device may have the image pickup area divided into a first sub-image pickup area and a second sub-image pickup area such that at least one pixel included in the first sub-image pickup area may output an image signal from an uppermost line to a bottommost line and from left to right within one line in sequence, at least one pixel included in the second sub-image pickup area may output an image signal from the bottommost line to the uppermost line and from the left to the right within one line in sequence, wherein the pixels outputting the image signals of the first and the second sub-image pickup areas may be symmetrical to each other with respect to a boundary between the first and the second sub-image pickup areas.

The image pickup device may have the image pickup area divided into a first sub-image pickup area, a second sub-image pickup area, a third sub-image pickup area, and a fourth sub-image pickup area which are arranged in a line.

At least one pixel included in the first sub-image pickup area may output an image signal from an uppermost line to a bottommost line and from left to right within one line in sequence, at least one pixel included in the second sub-image pickup area may output an image signal from the bottommost line to the uppermost line and from the left to the right within one line in sequence, at least one pixel included in the third sub-image pickup area may output an image signal from the uppermost line to the bottommost line and from the left to the right within one line in sequence, and at least one pixel included in the fourth sub-image pickup area may output an image signal from the bottom line to the uppermost line and from the left to the right within one line in sequence, and the pixels outputting the image signals of the first and the second sub-image pickup areas may be symmetrical to each other with respect to a boundary between the first and the second sub-image pickup areas, and wherein the pixels outputting the image signals of the third and the fourth sub-image pickup areas are symmetrical to each other with respect to a boundary between the third and the fourth sub-image pickup areas.

The image pickup device may have the image pickup area divided into a first sub-image pickup area, a second sub-image pickup area, a third sub-image pickup area, and a fourth sub-image pickup area which are arranged in a grid pattern.

At least one pixel included in the first sub-image pickup area may output an image signal from a bottommost line to an uppermost line and from right to left within one line in sequence, at least one pixel included in the second sub-image pickup area may output an image signals from the bottommost line to the uppermost line and from the left to the right within one line in sequence, at least one pixel included in the third sub-image pickup area may output an image signal from the uppermost line to the bottommost line and from the right to the left within one line in sequence, at least one pixel included in the fourth sub-image pickup area may output an image signal from the uppermost line to the bottommost line and from the left to the right within one line in sequence, and the pixels wherein outputting the image signals of the first through the fourth sub-image pickup areas may be symmetrical to one another with respect to an intersection point where boundary lines of the first through the fourth sub-image pickup areas cross over.

Each of the pixels may include a photo diode to convert light into an electric signal, and a plurality of transistors, and at least two pixels of the pixels may share one or more of the plurality of transistors.

Each of the pixels may include four transistors, and at least four of the pixels may share three of the four transistors.

The image pickup device may include a complementary metal oxide semiconductor (CMOS) photo sensor.

The image pickup device may employ a rolling shutter method.

The foregoing and/or other aspects and utilities of the general inventive concept may also be achieved by providing an image pickup device including a plurality of pixels forming an image pickup area, and an analog-to-digital (AD) converter to convert analog signals output from the plurality of pixels into digital signals, and the image pickup area may be divided into a plurality of sub-image pickup areas, and at least one pixel included in each of the sub-image pickup areas outputs image signals at the same time.

The foregoing and/or other aspects and utilities of the general inventive concept may also be achieved by providing an image pickup device usable with a photographing apparatus, the image pickup device including an image pickup area including a plurality of sub-image pickup areas each having a plurality of pixels, pixels in one sub-image area are symmetrical to pixels in an other sub-image area with respect to at least one of a boundary and an intersection between the sub-image pickup areas, respectively, and an image processor to process image signals from the plurality of pixels by processing each respective pair of the symmetrical pixels with respect to the at least one of the boundary and the intersection between the sub-image pickup areas at a same time.

The respective pair of symmetrical pixels furthest from the at least one of the boundary and the intersection between the sub-image pickup areas may be processed first and the respective pair of symmetrical pixels closest to the at least one of the boundary and the intersection between the sub-image pickup areas may be processed last.

Each of the pixels may include a photo diode to convert light into an electric signal, and a plurality of transistors such that each of the respective transistors is shared by at least two pixels.

The foregoing and/or other aspects and utilities of the general inventive concept may also be achieved by providing a method of processing image signals in a photographing apparatus, the method including dividing an image pickup area into a plurality of sub-image pickup areas each having a plurality of pixels such that pixels in one sub-image area are symmetrical to pixels in an other sub-image area with respect to at least one of a boundary and an intersection between the sub-image pickup areas, respectively, and processing the image signals from the plurality of pixels by processing each respective pair of the symmetrical pixels with respect to the at least one of the boundary and the intersection between the sub-image pickup areas at a same time.

The processing of the image signals may further include processing respective pair of symmetrical pixels furthest from the at least one of the boundary and the intersection between the sub-image pickup areas first, and processing the respective pair of symmetrical pixels closest to the at least one of the boundary and the intersection between the sub-image pickup areas last.

The foregoing and/or other aspects and utilities of the general inventive concept may also be achieved by providing a computer-readable recording medium having embodied thereon a computer program to execute a method, wherein the method includes dividing an image pickup area into a plurality of sub-image pickup areas each having a plurality of pixels such that pixels in one sub-image area are symmetrical to pixels in an other sub-image area with respect to at least one of a boundary and an intersection between the sub-image pickup areas, respectively, and processing image signals from the plurality of pixels by processing each respective pair of the symmetrical pixels with respect to the at least one of the boundary and the intersection between the sub-image pickup areas at a same time.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 2A and 2B are views illustrating an image pickup area which is vertically divided into four areas to read out an image according to exemplary embodiments of the present general inventive concept;

DETAILED DESCRIPTION OF THE PREFERRED EMBODIMENTS

Figure 1:
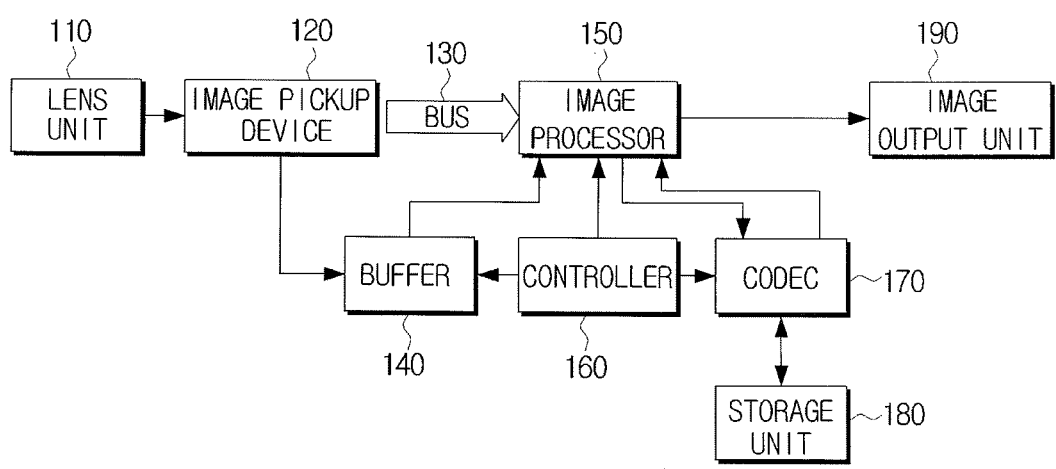
FIG. 1 is a block diagram illustrating a photographing apparatus according to an exemplary embodiment of the present general inventive concept.

Reference will now be made in detail to embodiments of the present general inventive concept, examples of which are illustrated in the accompanying drawings, wherein like reference numerals refer to the like units throughout. The embodiments are described below in order to explain the present general inventive concept by referring to the numerals.

FIG. 1 is a block diagram illustrating a photographing apparatus according to an exemplary embodiment of the present general inventive concept. As illustrated in FIG. 1, a photographing apparatus according to an exemplary embodiment of the present general inventive concept includes a lens unit 110, an image pickup device 120, a BUS 130, a buffer 140, an image processor 150, a controller 160, a codec 170, a storage unit 180, and an image output unit 190.

The lens unit 110 collects light from an object and focuses the light on an image pickup area to generate an optical image.

The image pickup device 120 converts incident light from a lens into an electric signal and performs a predetermined signal-processing operation with respect to the electric signal.

The image pickup device 120 includes pixels and an analog-to-digital (AD) converter. Each pixel outputs image signals of analog format and the AD converter converts the analog image signals into image signals of digital format and outputs the digital image signals.

Also, each pixel of the image pickup device 120 includes a complementary metal oxide semiconductor (CMOS) photo sensor, and reads out an optical image using a rolling shutter method. Herein, in the rolling shutter method, one or several pixels read out an optical image in sequence.

The plurality of pixels of the image pickup device 120 forms an image pickup area. The image pickup area of the image pickup device 120 is divided into a plurality of sub-image pickup areas, and at least one pixel included in each of the sub-image pickup areas reads out an optical image and outputs image signals simultaneously with image signals of other sub-image pickup areas.

Patterns in which the sub-image pickup areas of the image pickup device 120 read out an optical image will be described in detail below.

The BUS 130 transmits the image signals generated by the image pickup device 120 to the image processor 150. Also, the BUS 130 may transmit the image signals generated by the image pickup device 120 to the buffer 140. Also, the BUS 130 may be embodied as having a plurality of channels according to the output image signals.

The buffer 140 temporarily stores the image signals generated by the image pickup device 120. Also, the buffer 140 rearranges the temporarily stored image signals in sequence and transmits the image signals to the image processor 150.

The image processor 150 signal-processes the image signals input from the image pickup device 120 and the buffer 140, and transmits the processed image signals to the image output unit 190 to display a photographed image. Also, the image processor 150 outputs the processed image signals to the codec 170 to store the photographed image.

More specifically, the image processor 150 performs a format conversion with respect to the image signals output from the image pickup device 120 and performs a digital zoom function to adjust an image scale, and an automatic white balancing (AWB), automatic focus (AF) and automatic exposure (AE) functions.

The codec 170 encodes the image signals received from the image processor 150 and transmits the encoded image signals to the storage unit 180. Also, the codec 170 decodes the encoded image signals stored in the storage unit 180 and transmits the decoded image signals to the image processor 150.

The storage unit 180 stores the image photographed by the image pickup device 120 in a compressed format. The storage unit 180 may be a flash memory, a hard disk or a DVD.

The image output unit 190 outputs the image signals received from the image processor 150 to an internal display device or an external output terminal.

The controller 160 controls entire operations of the photographing apparatus. More specifically, the controller 160 controls the image processor 150 to signal-process the photographed image, and also controls the codec 170 to encode or decode the image signals. Also, the controller 160 controls the buffer 140 to transmit the stored image signals to the image processor 150.

Hereinafter, methods to transmit image signals will be described with reference to FIGS. 2A to 4. FIG. 2A is a view illustrating an image pickup area which is vertically divided into four areas to read out an image according to an exemplary embodiment of the present general inventive concept.

As illustrated in FIG. 2A, according to an exemplary embodiment of the present general inventive concept, the image pickup area of the image pickup device 120 is divided into four sub-image pickup areas which are arranged in a line in a vertical direction. More specifically, a first sub-image pickup area, a second sub-image pickup area, a third sub-image pickup area, and a fourth sub-image pickup area are arranged from the top in sequence.

Also, FIG. 2A illustrates pixels represented by 16 lines. However, this is merely an example for the convenience of explanation. Practically, the image pickup area includes a greater number of lines. Hereinafter, the lines are called $1^{st}$ through $16^{th}$ lines from an uppermost line.

Figure 2B:
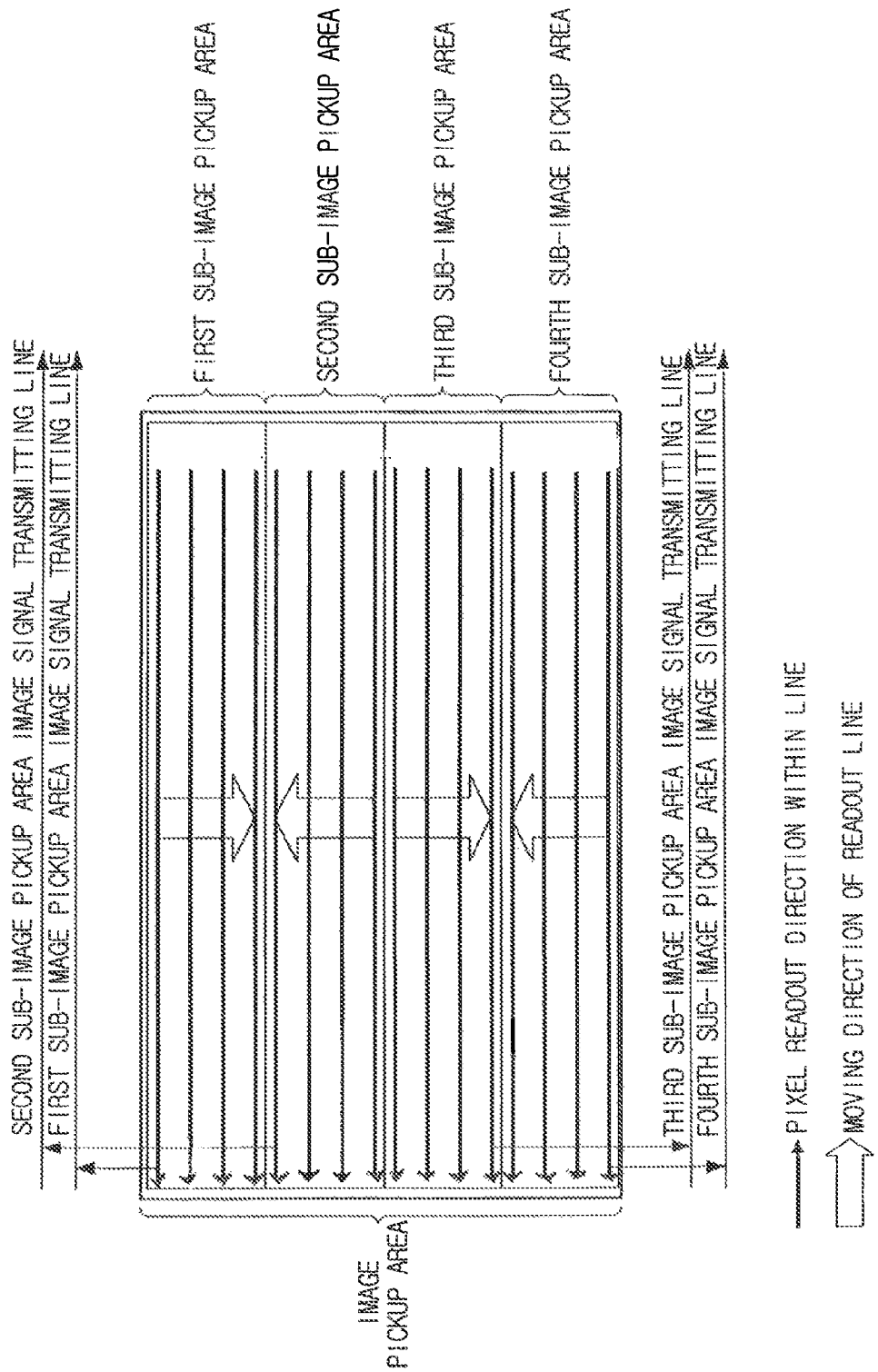

The rightwards black arrows in the image pickup area represent a direction in which a pixel of one line read out an image. That is, the readout operation starts from the left pixel within one line. The upwards and downwards white arrows represent moving directions of the readout lines. Alternatively, as illustrated in FIG. 2B, the readout operation may start from the right pixel within one line and continue to the left.

That is, in the first sub-image pickup area, the readout operation starts from the $1^{st}$ line located at the uppermost end portion. After the $1^{st}$ line readout operation, the readout operation is performed in order of $2^{nd}$, $3^{rd}$, and $4^{th}$ lines.

Alternatively, in the second sub-image pickup area, the readout operation starts from the $8^{th}$ line located at a bottommost end portion. After the $8^{th}$ line readout operation, the readout operation is performed in order of $7^{th}$, $6^{th}$, and $5^{th}$ lines.

Accordingly, the pixels outputting image signals in the first sub-image pickup area and the second sub-image pickup area are symmetrical to each other with respect to a boundary between the first sub-image pickup area and the second sub-image pickup area.

In the same way, the pixels outputting image signals in the third sub-image pickup area and the fourth sub-image pickup area are symmetrical to each other with respect to a boundary between the third sub-image pickup area and the fourth sub-image pickup area.

Also, the pixels outputting image signals in the first and the second sub-image pickup areas are symmetrical to the pixels outputting image signals in the third and the fourth sub-image pickup areas with respect to a boundary between the second sub-image pickup area and the third sub-image pickup area.

Due to this symmetrical structure of the pixels, the photographed image can ensure a continuity to have a soft form. If the readout operation is also performed downwardly in the second sub-image pickup area and the fourth sub-image pickup area, the final readout pixel of the first sub-image pickup area does not meet the final readout pixel of the second sub-image pickup area and also the final readout pixel of the third sub-image pickup area does not meet the final readout pixel of the fourth sub-image pickup area. In this case, an object which is continuous in movement would likely be photographed as a discontinuous image.

Also, the image pickup area is divided into four areas and the readout operation is performed in the respective areas at a same time so that the time taken for the image pickup device 120 to read out all the image pickup areas can be reduced to ¼ of the normal time. Therefore, a degree of deformation can be lessened even if a moving object is photographed. That is, as the number of divided areas increases, the time taken to read out the all the image pickup areas can be reduced and thus the degree of deformation can be further lessened.

Also, as illustrated in FIG. 2A, the first through fourth sub-image pickup areas include respective separate image signal transmitting lines. Accordingly, a method to transmit four image signals to the image processor 150 is required. Hereinafter, this method will be described in detail below.

Figure 3:
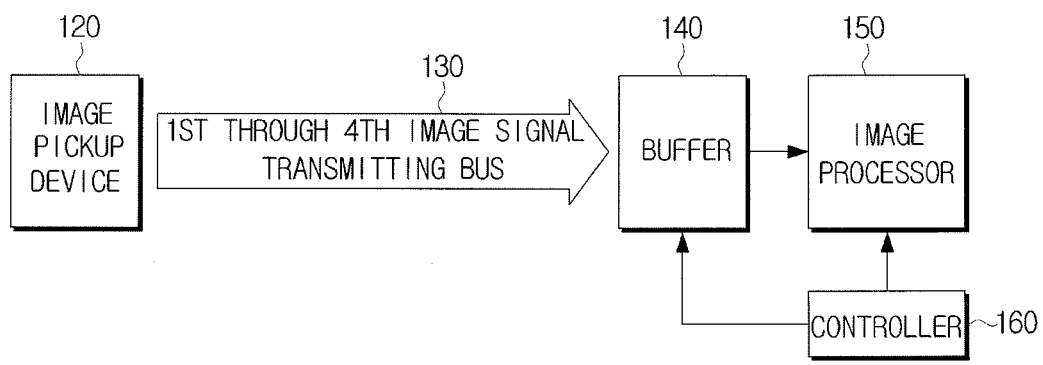
FIG. 3 is a block diagram illustrating portions of a photographing apparatus according to another exemplary embodiment of the present general inventive concept.
Figure 4:
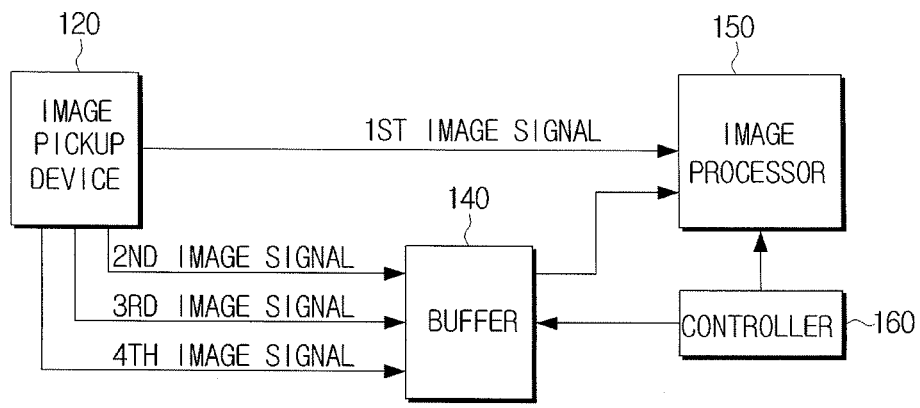
FIG. 4 is a block diagram illustrating portions of a photographing apparatus according to still another exemplary embodiment of the present general inventive concept.

FIG. 3 is a block diagram illustrating portions of a photographing apparatus according to an exemplary embodiment of the present general inventive concept. As illustrated in FIG. 3, in this embodiment, four image signals are transmitted through a BUS 130 at a time. In FIGS. 3 and 4, image signals output from the first through the fourth sub-image pickup areas are referred to as first through fourth image signals, respectively.

According to the exemplary embodiment illustrated in FIG. 3, the BUS 130 transmits the first through the fourth image signals to a buffer 140 at the same time. Accordingly, the BUS 130 has to include at least four channels.

The image signals transmitted to the buffer 140 are rearranged and then transmitted to an image processor 150. This is because the image signals of the first sub-image pickup area are transmitted from the $1^{st}$ line to the $4^{th}$ line in sequence, whereas the image signals of the second sub-image pickup area are transmitted in reverse order from the $8^{th}$ line to the $5^{th}$ line.

That is, the image signals are transmitted to the buffer 140 in order of (1, 8, 9, 16), (2, 7, 10, 15), (3, 6, 11, 14), (4, 5, 12, 13). The numbers in the bracket denotes lines. That is, (1, 8, 9, 16) denotes $1^{st}$ line, $8^{th}$ line, $9^{th}$ line, and $16^{th}$ line.

After receiving the image signals of all lines for one image pickup area, the buffer 140 rearranges the lines and transmits the image signals to the image processor 150.

The image signals may be transmitted in a different method from that described above, and this will be described with reference to FIG. 4. FIG. 4 is a block diagram illustrating portions of a photographing apparatus according to still another exemplary embodiment of the present general inventive concept.

Referring to FIG. 4, according to still another exemplary embodiment of the present general inventive concept, an image pickup device 120 transmits only a first image signal output from a first sub-image pickup area to an image processor 150. The remaining signals, i.e., second to fourth image signals are stored to a buffer 140.

In this embodiment, the image processor 150 receives the first image signal and signal-processes the first image signal in advance. If the first image signal is completely transmitted to the image processor 150, the second through the fourth image signals are completely stored to the buffer 140. Accordingly, the image processor 150 is enabled to receive the second image signal from the buffer 140 right after receiving the first image signal. That is, if the second through the fourth image signals are completely stored to the buffer 140, the buffer 140 transmits from the second image signal to the fourth image signal in sequence to the image processor 150.

Up to now, the image pickup area being vertically divided into four areas and the methods to transmit four image signals have been described with reference to FIGS. 2 to 4.

In the above embodiments, the image pickup area is vertically divided into four areas but other methods can be employed to divide the image pickup area.

For example, the image pickup area is divided into four sub-image pickup areas in the form of a grid pattern. In this case, pixels outputting image signals of first through fourth sub-image pickup areas are symmetrical to one another with respect to an intersection point where boundary lines among the sub-image pickup areas cross over. This is because the symmetrical structure of pixels guarantees a continuity of a photographed image. The example in which the image pickup area is divided into four sub-image pickup areas in the form of a grid pattern is illustrated in a view 940 of FIG. 9.

Also, in the above embodiments, the image pickup area is divided into four areas, but this is merely an example for the convenience of explanation. The image pickup area may be divided into a different number of areas. For example, the image pickup area may be divided into 2 areas or more than 4 areas.

Hereinafter, a cause of deformation which occurs if a moving object is photographed and the degree of deformation lessened by dividing an image pickup area will be described with reference to FIGS. 5A to 9.

Figure 5A:
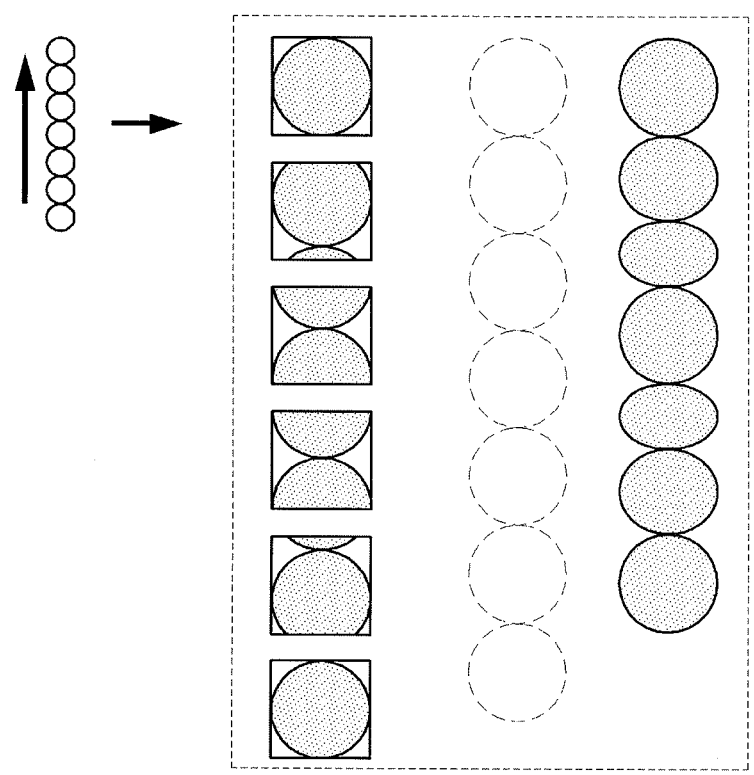
FIGS. 5A and 5B are views illustrating examples of contracting and expanding deformation according to an exemplary embodiment of the present general inventive concept.
Figure 5B:
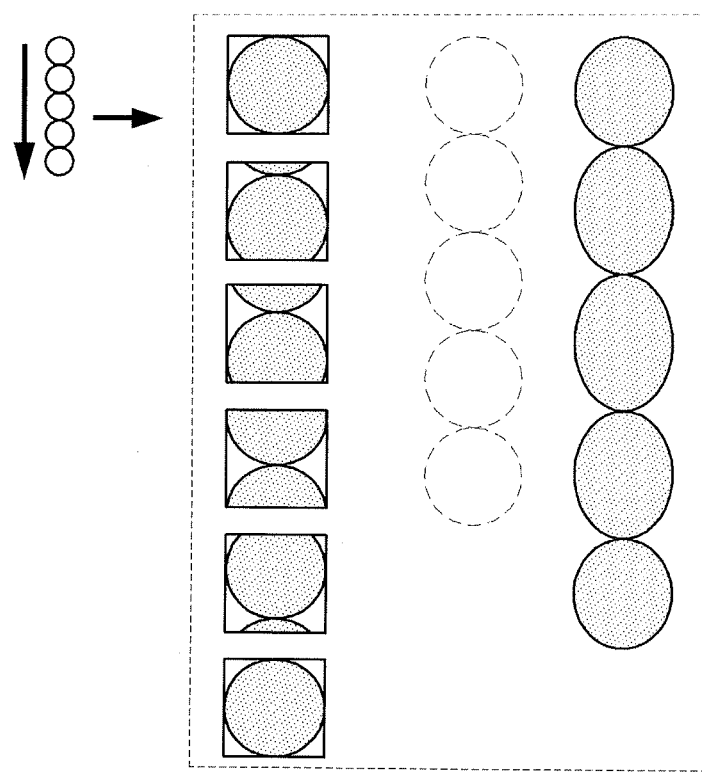

FIGS. 5A and 5B are views illustrating examples of expanding deformation according to an exemplary embodiment of the present general inventive concept. This embodiment illustrates deformation that occurs if an image pickup area is not divided and pixels read out an image from the left to the right and from the top to the bottom.

FIG. 5A illustrates compressed deformation occurring if an object moves up. As illustrated in FIG. 5A, if an object moves up, the object is photographed as an image upwardly compressed due to a difference between points of time when respective lines are read out. This is because the second line is read out after the first line is read out and thus when the second line is read out, the object slightly moves further up than when the first line was read out. A degree of deformation becomes greater toward a respective lower line, which results in the compressed deformation.

FIG. 5B illustrates expanding deformation occurring if an object moves down. As illustrated in FIG. 5B, if an object moves down, the object is photographed as an image downwardly expanding due to different between points of time when respective lines are read out. This is because the second line is read out after the first line is read out and thus when the second line is read out, the object slightly moves further down than when the first line was read out. The degree of deformation becomes greater toward a lower end, which results in the expanding deformation.

Hereinafter, how the degree of deformation is lessened if an image pickup area is divided compared to the case that the image pickup area is not divided will be described with reference to FIGS. 6 to 8.

Figure 6:
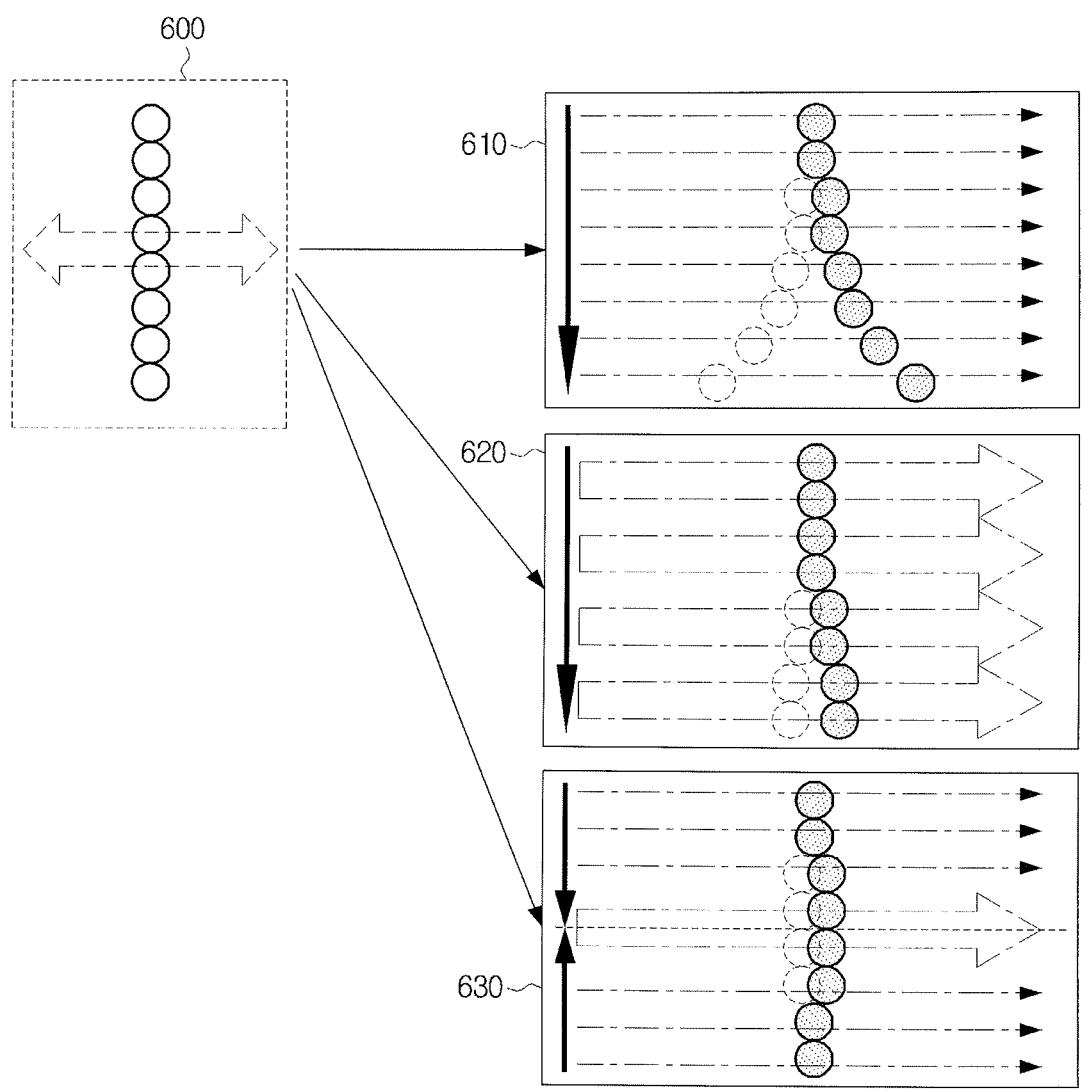
FIG. 6 is a view illustrating examples of deformation of an image photographed if an object horizontally moves according to an exemplary embodiment of the present general inventive concept.

The $1^{st}$ view 600 in FIG. 6 illustrates an object which horizontally moves.

The $2^{nd}$ view 610 illustrates the case where an image pickup area is not divided and lines are read out one by one. As can be seen from the $2^{nd}$ view 610, the degree of deformation of an image becomes greater from an uppermost line toward a bottommost line.

The $3^{rd}$ view 620 illustrates the case where an image pickup area is not divided and lines are read out two by two. If two lines are read out at a time, a shorter period of time is taken to read out the image pickup area and the degree of deformation of the photographed image is lessened somewhat as illustrated in the drawing. However, the degree of deformation is still greater at the bottommost line than at the uppermost line.

The $4^{th}$ view 630 illustrates the case where an image pickup area is divided into 2 sub-image pickup areas and lines are read out one by one in each of the sub-image pickup area. In this case, there is slight deformation in the middle of the image pickup area but the degree of deformation is lessened.

As described above, if an object horizontally moves, the degree of deformation of a photographed image can be lessened by dividing the image pickup area.

Figure 7:
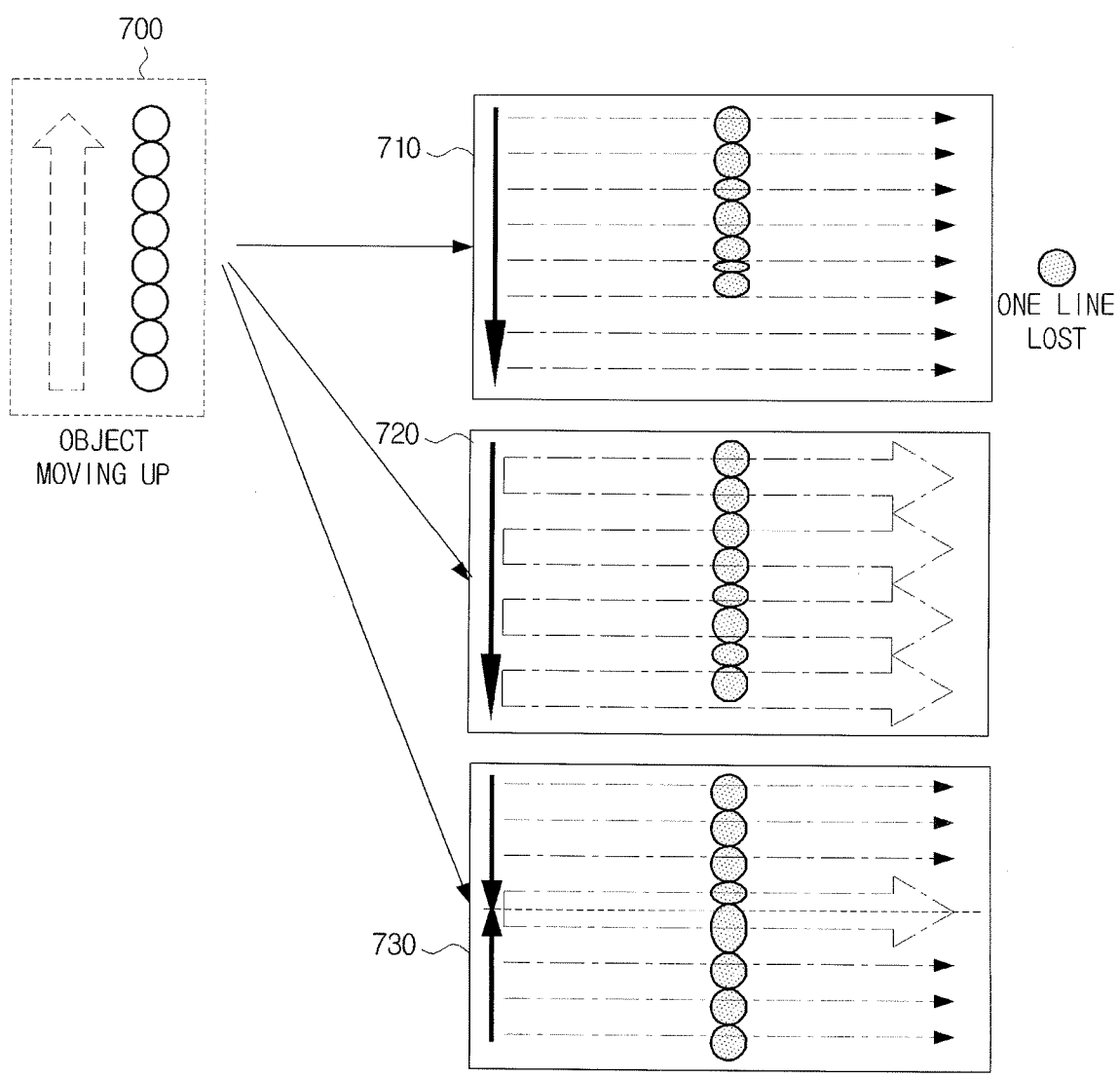
FIG. 7 is a view illustrating examples of deformation of an image photographed if an object moves up according to an exemplary embodiment of the present general inventive concept.

FIG. 7 is a view illustrating examples of deformation of a photographed image if an object moves up according to an exemplary embodiment of the present general inventive concept. The $5^{th}$ view 700 of FIG. 7 illustrates an object which moves up.

The $6^{th}$ view 710 illustrates the case where an image pickup area is not divided and lines are read out one by one. As can be seen from the $6^{th}$ view 710, a photographed image suffers high degree of compressed deformation. Also, the object of the $5^{th}$ view 700 has 8 circles but the image of the $6^{th}$ view 710 has 7 images including circles and ovals in total. Accordingly, one line is lost.

The $7^{th}$ view 720 illustrates the case where an image pickup area is not divided and lines are read out two by two. If two lines are read out at a time, a shorter period of time is taken to read out the image pickup area and thus the degree of deformation of a photographed image is lessened somewhat.

The $8^{th}$ view 730 illustrates the case where an image pickup area is divided into two sub-image pickup areas and lines are read out one by one in each of the two sub-image pickup areas. In this case, there is deformation of a photographed image in a middle of the image pickup area but the degree of deformation is lessened compared to the $6^{th}$ view 710.

As described above, if an object moves up, degree of deformation of a photographed image can be lessened by dividing the image pickup area.

Figure 8:
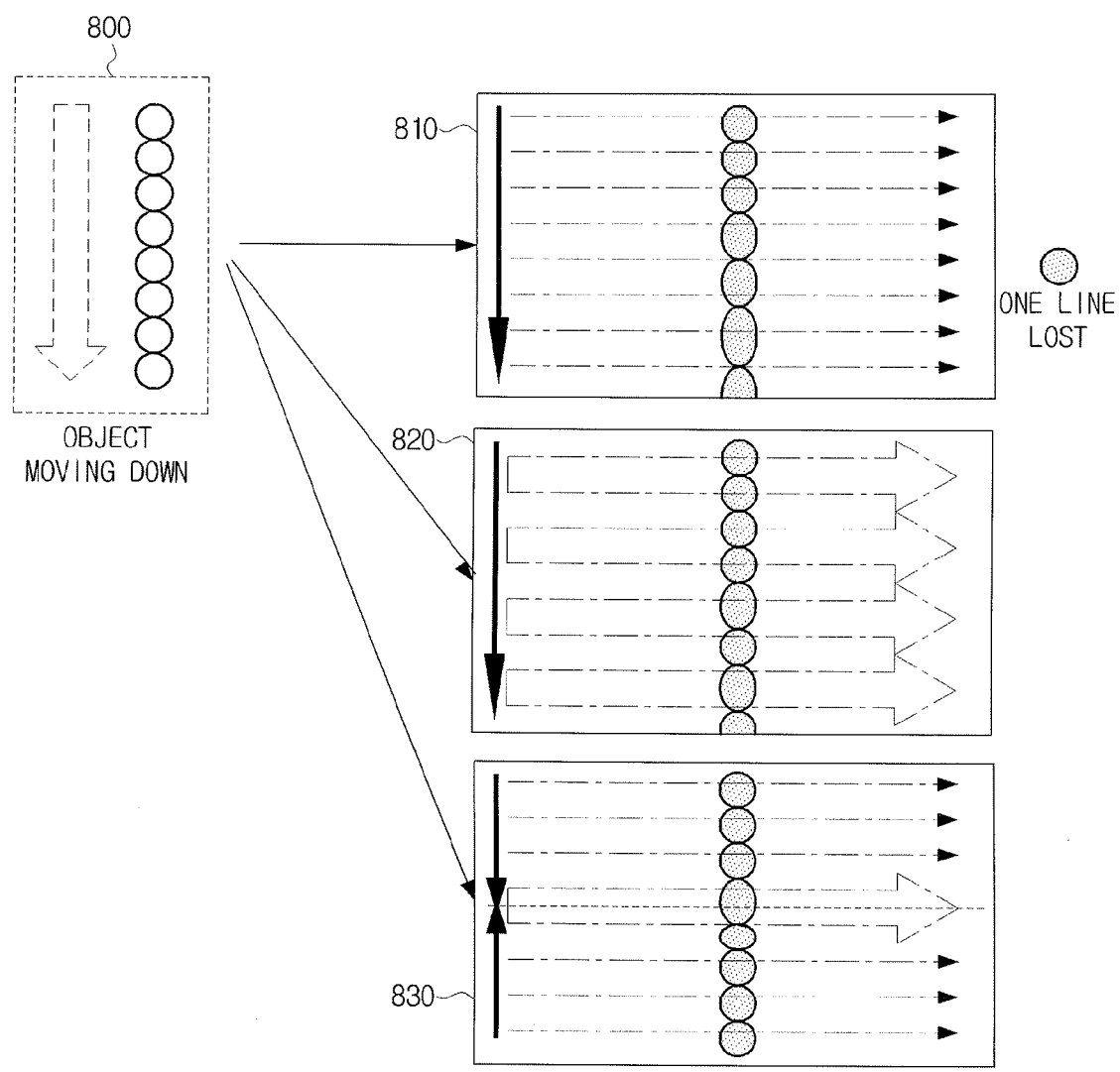
FIG. 8 is a view illustrating examples of deformation of an image photographed if an object moves down according to an exemplary embodiment of the present general inventive concept.

FIG. 8 is a view illustrating examples of deformation of a photographed image if an object moves down. The $9^{th}$ view 800 of FIG. 8 illustrates an object which moves down.

The $10^{th}$ view 810 illustrates the case where an image pickup area is not divided and lines are read out one by one. As can be seen from the $10^{th}$ view 810, a photographed image suffers a high degree of expanding deformation. Also, the object of the $9^{th}$ view 800 has 8 circles but the $10^{th}$ view 810 illustrates 7 images including circles and ovals in total. Accordingly, one line is lost.

The $11^{th}$ view 820 illustrates the case where an image pickup area is not divided and lines are read out two by two. If two lines are read out at a time, a shorter period of time is taken to read out the image pickup area and thus the degree of deformation of a photographed image is lessened somewhat. However, the expanding deformation still can be found at a bottommost line.

The $12^{th}$ view 830 illustrates the case where an image pickup area is divided into two sub-image pickup areas and lines are read out one by one in each of the two sub-image pickup areas. In this case, deformation of photographed image is found in a middle of the image pickup area but the degree of deformation is remarkably reduced compared to the $10^{th}$ and $11^{th}$ views 810 and 820.

As described, if an object moves down, the degree of deformation of a photographed image is lessened by dividing the image pickup area.

Figure 9:
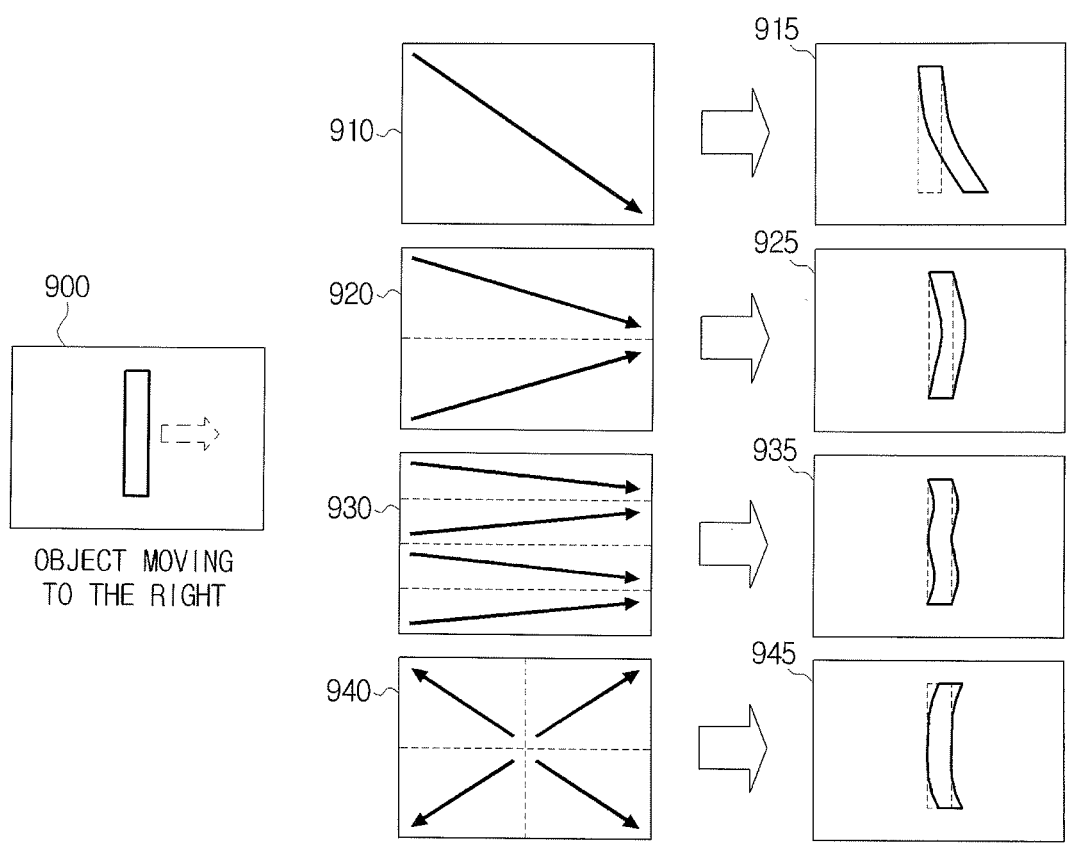
FIG. 9 is a view illustrating examples of deformation according to methods to divide an image pickup area according to an exemplary embodiment of the present general inventive concept.

FIG. 9 is a view illustrating examples of deformation according to how an image pickup area is divided according to an exemplary embodiment of the present general inventive concept. The 13th view 900 of FIG. 9 illustrates a bar type object which moves to the right.

If the image pickup device 120 reads out the object which moves to the right as illustrated in the 13th view 900 in a "south east" direction as illustrated in the 14th view 910, a lower end portion of a photographed image is greatly deformed as illustrated in the 15th view 915.

However, if the image pickup area is vertically divided into two areas as illustrated in the 16th view 920, only a middle portion of the photographed image is slightly deformed as illustrated in the 17th view 925.

Furthermore, if the image pickup area is vertically divided into four areas as illustrated in the 18th view 930, the degree of deformation of the photographed image is further lessened as illustrated in the 19th view 935.

Also, if the image pickup area is divided into four areas in a grid pattern as illustrated in the 20th view 940, degree of deformation is greatly reduced except for both end portions of the photographed image as illustrated in the 21st view 945.

As described above, it was described with reference to FIGS. 5A to 9 that the degree of deformation is reduced if the image pickup area of the image pickup device 120 is divided.

Figure 10A:
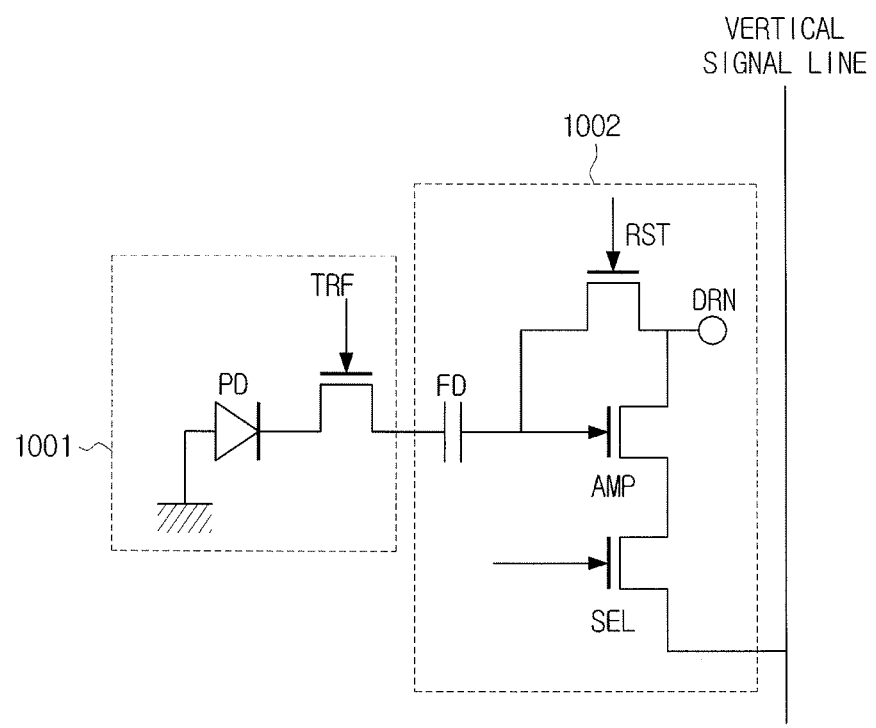
FIGS. 10A and 10B are views illustrating a pixel structure of a CMOS photo sensor according to an exemplary embodiment of the present general inventive concept.
Figure 10B:
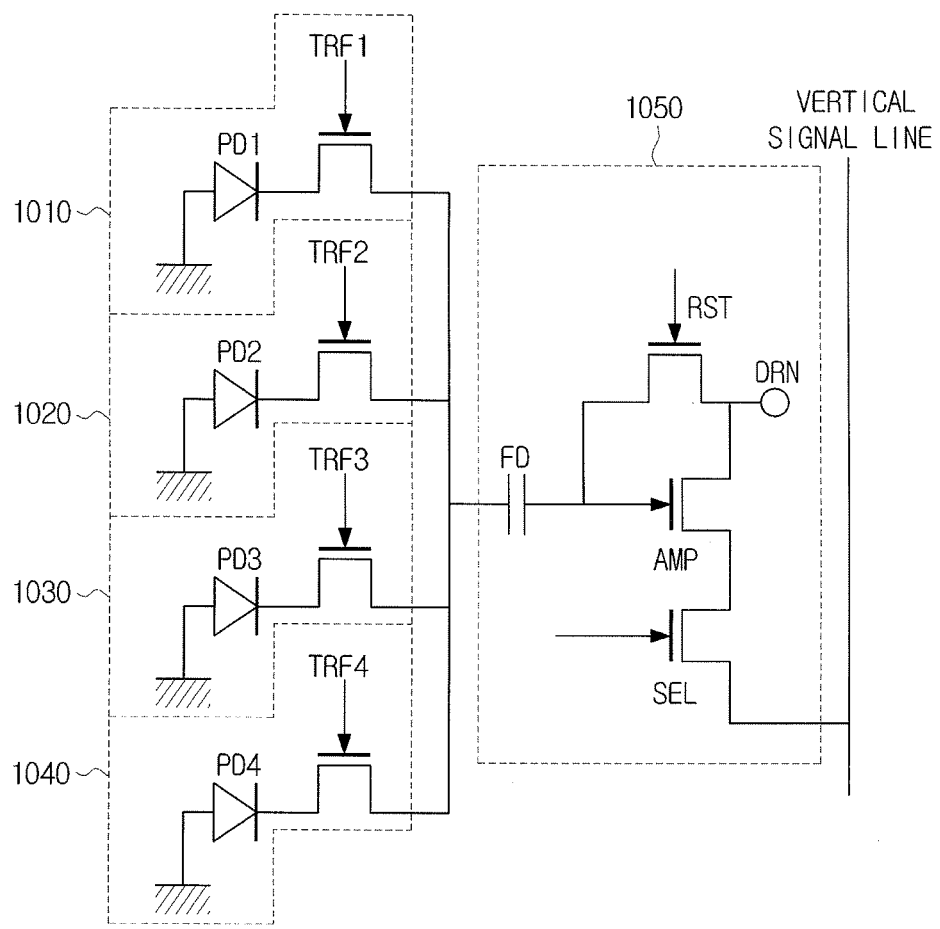

Hereinafter, a CMOS photo sensor pixel will be described in detail with reference to FIGS. 10A and 10B. FIGS. 10A and 10B are views illustrating pixel structures of a CMOS photo sensor according to an exemplary embodiment of the present general inventive concept.

FIG. 10A is a view illustrating one pixel of the CMOS photo sensor. As illustrated in FIG. 10A, one pixel of the CMOS photo sensor includes one photo diode (PD), one capacitor (FD), and four transistors (TRF), (RST), (AMP) and (SEL).

As illustrated in FIG. 10A, the CMOS pixel includes a light receiving unit 1001 and a signal output unit 1002. The light receiving unit 1001 includes a photo diode (PD) and a transfer transistor (TRF), and the signal output unit 1002 includes a floating diffusion (FD), a reset transistor (RST), an AMP transistor, an address select transistor (SEL), and a drain (DRN).

The light receiving unit 1001 receives incoming light at the PD, converts the light into an amount of electric charge, which is a type of electric signal, according to an amount of light, and transmits the amount of electric charge through the TRF. The signal output unit 1002 charges the FD with the amount of electric charge transmitted from the light receiving unit 1001. Also, the signal output unit 1002 converts the amount of electric charge into an electric signal as voltage which is easy to deal with electronically, using the RST, the AMP, and the SEL, and outputs the electric signal through a vertical signal line.

FIG. 10B is a view illustrating four pixels which share a first signal output unit 1050. As illustrated in FIG. 10B, a first light receiving unit 1010, a second light receiving unit 1020, a third light receiving unit 1030, and a fourth light receiving unit 1040 share the first signal output unit 1050.

If the four pixels share the first signal output unit 1050 as illustrated in FIG. 10B, the four pixels occupy a smaller space than in the case that one pixel for one signal output unit is used as illustrated in FIG. 10A. Accordingly, the image pickup device 120 can achieve compactness using the CMOS pixel of FIG. 10B.

In this embodiment, the CMOS type image pickup device 120 has been mainly described but the present general inventive concept is applicable to an image pickup device which has a different photo sensor employing the rolling shutter method.

Also, in this embodiment, one pixel per one sub-image pickup area reads out an image. However, a plurality of pixels may read out an image at the same time in one sub-image pickup area.

Also, in this embodiment, the image is read out from the top to the bottom in the odd numbered sub-image pickup areas and the image is read out from the bottom to the top in the even numbered sub-image pickup areas. However, the readout operation may be performed in the reverse direction. That is, the image may be read out from the bottom to the top in the odd numbered sub-image pickup areas and the image may be read out from the top to the bottom in the even numbered sub-image pickup areas.

Also, in this embodiment, the pixel in each line of sub-image pickup area reads out the image from the left to the right in sequence. However, the pixel may read out the image in the reverse direction. That is, the pixel in each line of sub-image pickup area may read out the image from the right to the left in sequence.

According to the exemplary embodiments of the present general inventive concept described above, since the photographing apparatus of which the image pickup area is divided into the plurality of sub-image pickup areas and the image pickup device thereof are provided, a degree of deformation of a photographed image can be lessened if the object moves.

In particular, since the respective sub-image pickup areas read out an optical image at the same time, the optical image of the image pickup area is read out more rapidly. Accordingly, degree of deformation of a photographed image can be lessened if the object moves.

Also, since the pixels share the transistor, a space occupied by one pixel can be reduced. Accordingly, compactness of the image pickup device 120 can be achieved.

Figure 11:
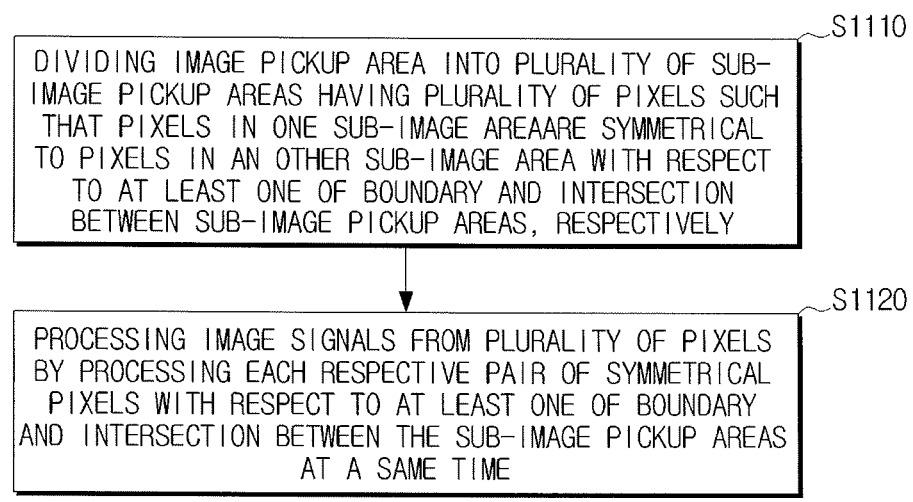
FIG. 11 illustrates a method of processing image signals in a photographing apparatus according to an embodiment of the present general inventive concept.

FIG. 11 illustrates a method of processing image signals in a photographing apparatus according to an embodiment of the present general inventive concept. Referring to FIG. 11, in operation S1110, an image pickup area is divided into a plurality of sub-image pickup areas having a plurality of pixels such that pixels in one sub-image area are symmetrical to pixels in an other sub-image area with respect to at least one of a boundary and an intersection between the sub-image pickup areas, respectively. In operation S1120, the image signals from the plurality of pixels are processed by processing each respective pair of the symmetrical pixels with respect to the at least one of the boundary and the intersection between the sub-image pickup areas at a same time.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A photographing apparatus, comprising:
   an image pickup device having an image pickup area that is divided into at least four sub-image pickup areas, the sub-image pickup areas comprising pixels that comprise CMOS photo sensors, the image pickup device configured to concurrently perform a rolling shutter method in each of the sub-image pickup areas, so as to simultaneously output image signals produced by the pixels of each of the sub-image pickup areas; and
   an image processor to process the image signals output from the image pickup device,
   wherein the at least four sub-image pickup areas are arranged such that each sub-image pick-up area comprises a plurality of rows of pixels and at least one pixel included in a first and a third numbered sub-image pickup area outputs an image signal from an uppermost line to a bottommost line adjacent to another of the at least four sub-image pickup areas, and from left to right within one line in sequence, and at least one pixel included in a second and a fourth numbered sub-image pickup area outputs an image signal from the bottommost line to the uppermost line adjacent to another of the at least four sub-image pickup areas, and from the left to the right within one line in sequence.

2. The photographing apparatus of claim 1, further comprising:
   a BUS to transmit the image signals output from the image pickup device to the image processor through a number of channels corresponding to a number of sub-image pickup areas.

3. The photographing apparatus of claim 1, further comprising:
   a storage unit to store the image signals output from the image pickup device,
   wherein the image pickup device transmits an image signal output from the at least one sub-image pickup area of the image pickup device to the image processor and transmits an image signal output from a remaining sub-image pickup area to the storage unit.

4. The photographing apparatus of claim 1, wherein the image pickup device controls the rolling shutter method to simultaneously output image data from at least one pixel included in one of the sub-image pickup areas and from at least one pixel of an adjacent sub-image pickup area that is symmetrical to the at least one pixel included in the one of the sub-image pickup areas, with respect to a boundary between the one sub-image pickup area and the adjacent sub-image pickup area.

5. The photographing apparatus of claim 1, wherein the image pickup device controls the rolling shutter method to simultaneously output image data from at least one pixel of one of the sub-image pickup areas and from at least one pixel of each of remaining sub-image pickup areas that is symmetrical to the at least one pixel of the one of the sub-image pickup areas, with respect to an intersection point at which boundary lines of the sub-image pickup areas cross over.

6. The photographing apparatus of claim 1, wherein the sub-image pickup areas comprise a first sub-image pickup area and a second sub-image pickup area disposed such that at least one pixel included in the first sub-image pickup area outputs an image signal from an uppermost line to a bottommost line and from left to right within one line in sequence and at least one pixel included in the second sub-image pickup area outputs an image signal from the bottommost line to the uppermost line and from the left to the right within one line in sequence,
   wherein the pixels outputting the image signals of the first and the second sub-image pickup areas are symmetrical to each other with respect to a boundary between the first and the second sub-image pickup areas.

7. The photographing apparatus of claim 1, wherein the sub-image pickup areas comprise a first sub-image pickup area, a second sub-image pickup area, a third sub-image pickup area, and a fourth sub-image pickup area, and the pixels of each of the sub-image pickup areas are arranged in lines.

8. The photographing apparatus of claim 7, wherein:
   in the first sub-image pickup area, the image signals are output from an uppermost line to a bottommost line of pixels and from left to right within one line in sequence;
   the second sub-image pickup area outputs an image signal from a bottommost line of pixels to an uppermost line of pixels and from the left to the right within each line, in sequence;
   the third sub-image pickup area outputs an image signal from an uppermost line of pixels to a bottommost line of pixels and from the left to the right within each line, in sequence; and
   the fourth sub-image pickup area outputs an image signal from a bottommost line of pixels to an uppermost line of pixels and from the left to the right within each line, in sequence,
   wherein the pixels outputting the image signals of the first and the second sub-image pickup areas are symmetrical to each other with respect to a boundary between the first and the second sub-image pickup areas, and the pixels outputting the image signals of the third and the fourth sub-image pickup areas are symmetrical to each other with respect to a boundary between the third and the fourth sub-image pickup areas.

9. The photographing apparatus of claim 7, wherein each of the pixels comprises:
   four transistors, and at least four of the pixels share three of the four transistors.

10. The photographing apparatus of claim 1, wherein the sub-image pickup areas comprise a first sub-image pickup area, a second sub-image pickup area, a third sub-image pickup area, and a fourth sub-image pickup area which are arranged in a grid pattern.

11. A photographing apparatus, comprising: an image pickup device having an image pickup area that is divided into at least four sub-image pickup areas, the sub-image pickup areas comprising pixels that comprise CMOS photo sensors, the image pickup device configured to concurrently perform a rolling shutter method in each of the sub-image pickup areas, so as to simultaneously output image signals produced by the pixels of each of the sub-image pickup areas; and wherein the at least four sub-image areas are arranged such that each sub-image area comprises a plurality of rows of pixels; and a first sub-image pickup area outputs an image signal from a bottommost line of pixels to an uppermost line of pixels and from right to left within each line, in sequence; a second sub-image pickup area outputs an image signal from a bottommost line of pixels to an uppermost line of pixels and from the left to the right within each line, in sequence; a third sub-image pickup area outputs an image signal from an uppermost line of pixels to a bottommost line of pixels and from the right to the left within each line, in sequence; a fourth sub-image pickup area outputs an image signal from an uppermost line of pixels to a bottommost line of pixels and from the left to the right within each line, in sequence, wherein the pixels outputting the image signals of the first through the fourth sub-image pickup areas are symmetrical to one another with respect to an intersection point where boundary lines of the first through the fourth sub-image pickup areas cross over.

12. The photographing apparatus of claim 1, wherein each of the pixels comprises:
   a photo diode to convert light into an electric signal; and
   a plurality of transistors,
   wherein at least two pixels of the pixels share one or more of the plurality of transistors.

13. A photographing apparatus, comprising: an image pickup device having an image pickup area that is divided into at least four sub-image pickup areas, the sub-image pickup areas comprising pixels that comprise CMOS photo sensors, the image pickup device configured to concurrently perform a rolling shutter method in each of the sub-image pickup areas, so as to simultaneously output image signals produced by the pixels of each of the sub-image pickup areas; and wherein the at least four sub-image areas are arranged such that each sub-image area comprises a plurality of rows of pixels and at least one pixel included in a first and a third numbered sub-image area outputs an image signal from an uppermost line to a bottommost line adjacent to another of the at least four sub-image pickup areas, and from right to left within one line in sequence, and at least one pixel included in a second and a fourth numbered sub-image area outputs an image signal from the bottommost line to uppermost line adjacent to another of the at least four sub-image pickup areas, and from the right to the left within one line in sequence.

14. A photographing apparatus, comprising: an image pickup device having an image pickup area that is divided into at least four sub-image pickup areas, the sub-image pickup areas comprising pixels that comprise CMOS photo sensors, the image pickup device configured to concurrently perform a rolling shutter method in each of the sub-image pickup areas, so as to simultaneously output image signals produced by the pixels of each of the sub-image pickup areas; and wherein the at least four sub-image areas are arranged such that each sub-image area comprises a plurality of rows of pixels and at least one pixel included in a first and a third numbered sub-image area outputs an image signal from an bottommost line to a uppermost line adjacent to another of the at least four sub-image pickup areas, and from left to right within one line in sequence, and at least one pixel included in a second and a fourth numbered sub-image area outputs an image signal from the uppermost line to bottommost line adjacent to another of the at least four sub-image pickup areas, and from the left to the right within one line in sequence.

15. A photographing apparatus, comprising: an image pickup device having an image pickup area that is divided into at least four sub-image pickup areas, the sub-image pickup areas comprising pixels that comprise CMOS photo sensors, the image pickup device configured to concurrently perform a rolling shutter method in each of the sub-image pickup areas, so as to simultaneously output image signals produced by the pixels of each of the sub-image pickup areas; and wherein the at least four sub-image areas are arranged such that each sub-image area comprises a plurality of rows of pixels and at least one pixel included in a first and a third numbered sub-image area outputs an image signal from an bottommost line to a uppermost line adjacent to another of the at least four sub-image pickup areas, and from right to left within one line in sequence, and at least one pixel included in a second and a fourth numbered sub-image area outputs an image signal from the uppermost line to bottommost line adjacent to another of the at least four sub-image pickup areas, and from the right to the left within one line in sequence.

16. An image pickup device, comprising:
   pixels comprising CMOS photo sensors and disposed in at least four sub-image pickup areas of an image pickup area of the device; and
   an analog-to-digital (AD) converter to convert analog signals output from the into digital signals,
   wherein the image pickup area is configured to concurrently perform a rolling shutter method in each of the at least four sub-image pickup areas, so as to simultaneously output image signals produced by the pixels of each of the sub-image pickup areas, and
   wherein the at least four sub-image pickup areas are arranged such that each sub-image pick-up area comprises a plurality of rows of pixels and at least one pixel included in a first and a third numbered sub-image pickup area outputs an image signal from an uppermost line to a bottommost line adjacent to another of the at least four sub-image pickup areas, and from left to right within one line in sequence, and at least one pixel included in a second and a fourth numbered sub-image pickup area outputs an image signal from the bottommost line to the uppermost line adjacent to another of the at least four sub-image pickup areas, and from the left to the right within one line in sequence.

17. An image pickup device usable with a photographing apparatus, the image pickup device comprising:
   an image pickup area that is divided into at least four sub-image pickup areas, the sub-image pickup areas comprising pixels that comprise CMOS photo sensors, the pixels in adjacent sub-image areas being symmetrically disposed with respect to a boundary between the sub-image pickup areas; and an image processor to process image signals from the pixels by processing each respective pair of the symmetrical pixels with respect to the at least one of the boundary and the intersection between the sub-image pickup areas at a same time,
   wherein the image pickup area outputs image data from the at least one of the pixels of each of the at least four sub-image pickup areas using a rolling shutter method, and the image pickup device controls the rolling shutter method to simultaneously output image data from each respective pair of the symmetrical pixels,
   wherein the at least four sub-image pickup areas are arranged such that each sub-image pick-up area comprises a plurality of rows of pixels and at least one pixel included in a first and a third numbered sub-image pickup area outputs an image signal from an uppermost line to a bottommost line adjacent to another of the at least four sub-image pickup areas, and from left to right within one line in sequence, and at least one pixel included in a second and a fourth numbered sub-image pickup area outputs an image signal from the bottommost line to the uppermost line adjacent to another of the at least four sub-image pickup areas, and from the left to the right within one line in sequence.

18. The image pickup device of claim 17, wherein the respective pair of symmetrical pixels furthest from the at least one of the boundary and the intersection between the sub-image pickup areas are processed first and the respective pair of symmetrical pixels closest to the at least one of the boundary and the intersection between the sub-image pickup areas are processed last.

19. The image pickup device of claim 17, wherein each of the pixels comprises:
- a photo diode to convert light into an electric signal; and
- a plurality of transistors such that each of the respective transistors is shared by at least two pixels.

20. A method of processing image signals in a photographing apparatus comprising at least four sub-image pickup areas that comprise pixels that comprise CMOS sensors, the method comprising:
- simultaneously performing a rolling shutter operation in each of the at least four sub-image pickup areas, so as to output image data from pairs of the pixels that are symmetrical disposed in different ones of the sub-image pickup areas, with respect to a boundary between the respective sub-image pickup areas; and
- simultaneously processing the image signals output from the symmetrical pairs of pixels,
- wherein the at least four sub-image pickup areas are arranged such that each sub-image pick-up area comprises a plurality of rows of pixels and at least one pixel included in a first and a third numbered sub-image pickup area outputs an image signal from an uppermost line to a bottommost line adjacent to another of the at least four sub-image pickup areas, and from left to right within one line in sequence, and at least one pixel included in a second and a fourth numbered sub-image pickup area outputs an image signal from the bottommost line to the uppermost line adjacent to another of the at least four sub-image pickup areas, and from the left to the right within one line in sequence.

21. The method of claim 20, wherein the processing of the image signals further comprises:
- processing respective pair of symmetrical pixels furthest from the at least one of the boundary and the intersection between the sub-image pickup areas first; and
- processing the respective pair of symmetrical pixels closest to the at least one of the boundary and the intersection between the sub-image pickup areas last.

22. A non-transitory computer-readable recording medium having embodied thereon a computer program to execute a method, the method comprising:
- simultaneously outputting image data from pixels that are disposed in at least four sub-image pickup areas of an image pickup area, using a rolling shutter method, the pixels each comprising a CMOS sensor, and the outputting pixels of adjacent sub-image pickup areas being symmetrically disposed with respect to a boundary between the at least four sub-image pickup areas; and
- processing image signals from the pixels by processing each respective pair of the symmetrical pixels at a same time,
- wherein the at least four sub-image pickup areas are arranged such that each sub-image pick-up area comprises a plurality of rows of pixels and at least one pixel included in a first and a third numbered sub-image pickup area outputs an image signal from an uppermost line to a bottommost line adjacent to another of the at least four sub-image pickup areas, and from left to right within one line in sequence, and at least one pixel included in a second and a fourth numbered sub-image pickup area outputs an image signal from the bottommost line to the uppermost line adjacent to another of the at least four sub-image pickup areas, and from the left to the right within one line in sequence.

* * * * *